United States Patent [19]

Kapgan et al.

[11] Patent Number: 4,934,743
[45] Date of Patent: Jun. 19, 1990

[54] ASSEMBLY FOR FORMING A MECHANICAL CONNECTION TO AN OBJECT

[75] Inventors: Michael Kapgan, Foster City; Peter Brooks, Los Altos, both of Calif.

[73] Assignee: Raychem Corporation, Menlo Park, Calif.

[21] Appl. No.: 307,382

[22] Filed: Feb. 7, 1989

[51] Int. Cl.⁵ .............................................. F16L 55/00
[52] U.S. Cl. ...................... 285/23; 285/381; 285/386; 29/447
[58] Field of Search ........................ 285/381, 23, 386; 29/447

[56] References Cited

U.S. PATENT DOCUMENTS 3,484,123 12/1969 van der Velden ................ 285/341
4,147,385 4/1979 van der Velden ................ 285/382.4
4,424,991 1/1984 Hill et al. ............................ 285/381
4,650,228 3/1987 McMills et al. ..................... 285/381

Primary Examiner—Dave W. Arola
Attorney, Agent, or Firm—Herbert G. Burkard; Simon J. Belcher

[57] ABSTRACT

An assembly for forming a mechanical connection to an object, such as a tube within a hydraulic system, comprising a transversely heat-shrinkable shape memory alloy collar having an axially facing surface, a ring having an axially facing surface and a device for retaining the ring and the collar coaxially with respect to one another. In use, the collar is caused to shrink so that it engages the external surface of the tube. Force can be applied axially to the object through the collar by means of the ring.

22 Claims, 2 Drawing Sheets

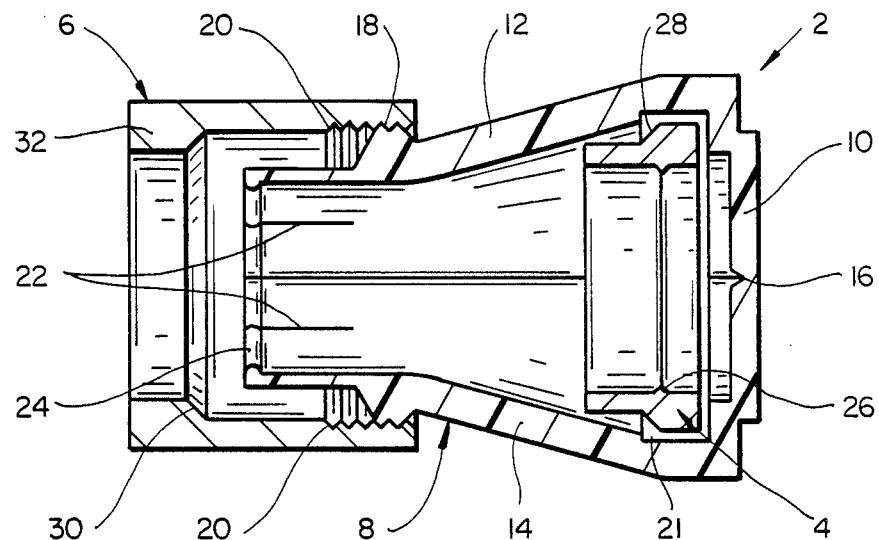
FIG_1

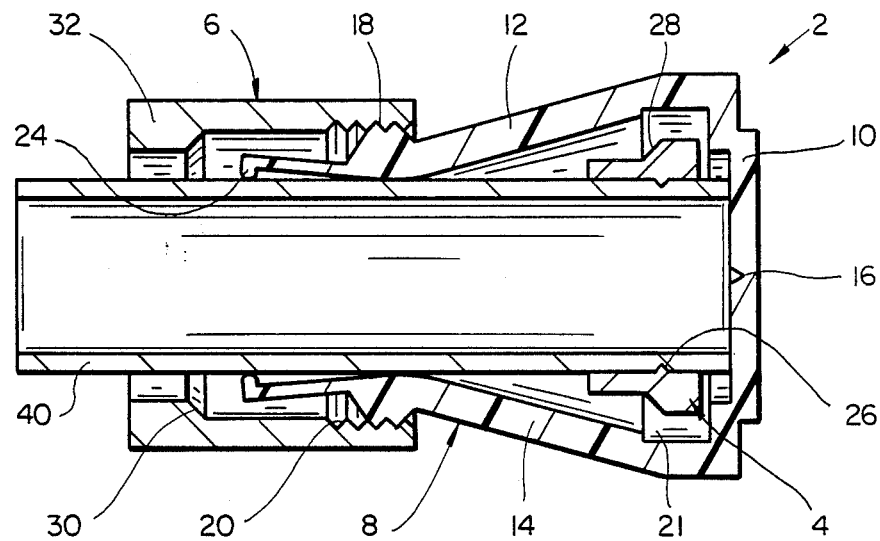
FIG_2
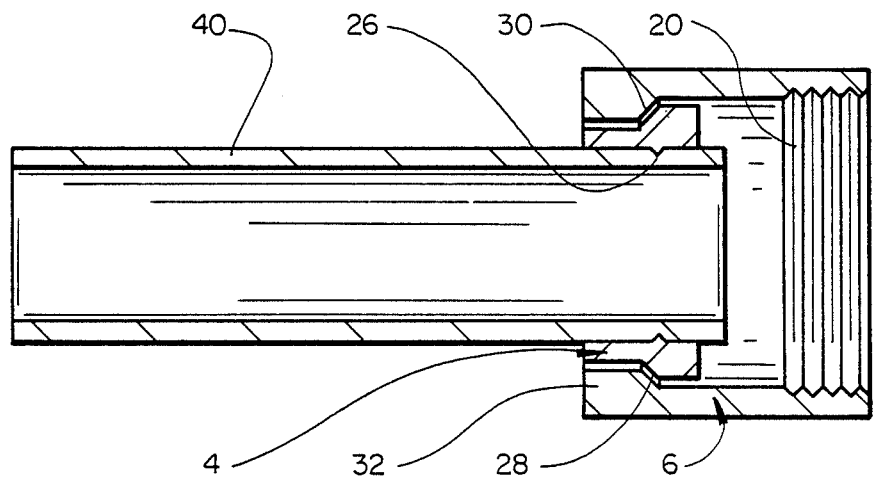
FIG_3

ASSEMBLY FOR FORMING A MECHANICAL CONNECTION TO AN OBJECT

BACKGROUND TO THE INVENTION

The invention relates to an assembly for forming a mechanical connection to an object, to a method of forming a mechanical connection to an object, and to an object to which a mechanical connection has been made.

It is known to make a mechanical connection to an object by attaching a collar to the external surface of the object, through which a force can be applied to the object in a direction parallel to the surface. This connection technique is used in particular to connect elongate objects which have a constant cross-section to one another, for example tubes (which term shall include pipes) and rods. For example, U.S. Pat. No. 3,484,123 discloses a tube coupling assembly comprising a collar which is rigidly fixed to a first tube by swaging, and a union member which is rigidly fixed to the second tube, also by swaging. The union member extends beyond the end of the second tube and has a threaded external surface. The assembly includes a nut which has a radially inwardly projecting flange at one end which abuts the collar, and which is threaded internally at its other end for engaging the threaded surface of the union member, so that rotation of the nut relative to the union member forces the two tubes towards one another.

It is also known to fix a collar to an object by welding instead of swaging. Welding is particularly useful when the material of the object makes swaging difficult, as is in the case with tubes formed from titanium.

More recently, it has been proposed to use a collar formed from a shape memory alloy, in order to avoid the need to swage an object or to form a weld for joining the object to the collar. Shape memory alloys exhibit a shape memory effect as a result of their ability to transform between martensitic and austenitic phases. The transformation may be caused by a change in temperature: for example, a shape memory alloy in the martensitic phase will begin to transform to the austenitic phase when its temperature increases to a temperature greater than $A_s$, and the transformation will be complete when the temperature is greater than $A_f$. The reverse transformation will begin when the temperature of the alloy is decreased to a temperature less than $M_s$ and will be complete when the temperature is less than $M_f$. The temperatures $M_s$, $M_f$, $A_s$ and $A_f$ define the thermal transformation hysteresis loop of a shape memory alloy. An article may be formed in a desired configuration while in its austenitic phase. If it is then cooled so that it transforms to the martensitic phase, it can then be deformed by up to about 8%. The strain imparted to the article is recovered when the article is subsequently heated so that it transforms back to the austenitic phase. Further information is available in the article by L. M. Schetky in Scientific American, Volume 241, pages 68 to 76 (1979) entitled Shape Memory Alloys.

The use of a shape memory alloy collar has the advantage that significantly less time and less skill are required on the part of the installer than are required to affix a collar either by swaging or by welding. Furthermore, the outlay in equipment required to install a shape memory alloy collar is significantly less than that required to install a collar by welding or swaging.

It is generally important that the collar be positioned accurately relative to the end of the object to which it is to be affixed. Manipulation of the collar can be difficult when the collar is small, or when the collar is formed from a shape memory alloy and the temperature of the collar must be increased to cause it to shrink transversely, whether by removal of the collar from a cryogenic fluid, or by the application of heat to the collar from an external source; the use of tools or insulation gloves can then make manipulation of the collar particularly difficult.

SUMMARY OF THE INVENTION

The present invention provides a technique for forming a mechanical connection to an object, in which a collar, particularly a transversely heat-shrinkable shape memory alloy collar, is engaged releasably by a device, which facilitates manipulation of the collar.

Accordingly, in one aspect, the invention provides an assembly for forming a mechanical connection to an object, which comprises:

(a) a collar formed from a shape memory alloy, which is transversely heat-shrinkable and has an axially facing surface;

(b) a ring having an axially facing surface for cooperation with the axially facing surface on the collar so that, when the collar has been heated to cause it to shrink to grip the object, an axial force can be applied to the object through the collar by means of the ring; and (c) a device which releasably engages the ring and the collar so as to hold the ring and the collar coaxially with respect to one another.

In another aspect, the invention provides a method of forming a mechanical connection to an object, which comprises:

(a) providing an object, and an assembly as described above;

(b) positioning the object so that it extends through the collar and the ring;

(c) increasing the temperature of the collar to a temperature above the $A_s$ temperature of the alloy to cause the collar to shrink transversely so as to engage the object; and (d) removing the device.

In a further aspect, the invention provides a method of forming a mechanical connection to an object, which comprises:

(a) providing an object, and an assembly which comprises (i) a collar having an axially facing surface, (ii) a ring having an axially facing surface for cooperation with the axially facing surface on the collar so that, when the collar is positioned around, and engages, the object, an axial force can be applied to the object through the collar by means of the ring, and (iii) a device which releasably engages the ring and the collar so as to hold the ring and the collar coaxially with respect to one another;

(b) positioning the object so that it extends through the collar and the ring;

(c) reshaping at least one of the object and the collar so as to cause the collar to engage the exterior surface of the object; and (d) removing the device.

Preferably, the collar is formed from a shape memory alloy and is transversely heat-shrinkable, and in the reshaping step of the method, the temperature of the collar is increased to a temperature above the $A_s$ temperature of the alloy to cause the collar to shrink transversely to engage the object. However, the method may involve reshaping at least one of the object and the collar by another technique, for example by internally swaging a tubular object.

The invention includes objects to which mechanical connections have been made by methods of the invention and assemblies for use in the methods of the invention.

DESCRIPTION OF THE INVENTION

The use of a device as a component of the assembly, to engage the ring and the collar to hold them coaxially with respect to one another, gives rise to significant advantages. For example, since a single assembly is positioned on the object, instead of a separate ring and collar, use of the device facilitates handling of the collar, allowing it to be positioned accurately on the object more easily, particularly when the collar is small or when causing the collar to engage the object involves changing the temperature of the collar such that use of tools or insulating gloves is required. This allows connections to be made in confined spaces. It also enables the collar to be positioned on the object more quickly which can be important when the collar is formed from a shape memory alloy which is caused to shrink by removing it from a cryogenic fluid since, unless the collar is correctly positioned before the temperature exceeds the $A_s$ temperature of the alloy, the collar will begin to shrink prematurely and in an incorrect position. Furthermore, it ensures that a collar cannot be affixed to the object without a ring having first been positioned on the object since the collar and the ring are positioned on the object together; if a collar is affixed to an object without a ring having first been positioned on the object, and if access can be gained to only one end of the object as is commonly the case, it is necessary to remove the collar to position the ring. The collar at least, and often also the object, will not then be reusable. The device also ensures that the collar and ring are oriented correctly, with their cooperating axially facing surfaces facing one another. This therefore removes the possibility of one of the collar and the ring being positioned on an object the wrong way round, which would require removal of the collar, and disposal of at least the collar and possibly also the object, in order to correct it.

The use of the device also has the advantage that the collar and the ring are supplied, as well as fitted, as parts of a single component. This simplifies inventory, and ensures that stocks of rings and collars remain balanced. Furthermore, the collar can be protected from damage, before it is fitted to the object, by the device. This is important since a small amount of damage to the collar can impair significantly the seal between the collar and the object. The device can also be used to protect the collar after it has been affixed to the object if it is not desired to make use immediately of the connection to the object. In this situation, the device can also protect the tube.

Preferably, the ring is provided with formation, such as a thread or a part of a bayonet fitting, with which it engages the device, and those formations also serve to make a connection between the ring and another component such as a union member in a tube coupling of the type disclosed in U.S. Pat. No. 3,484,123 referred to above. The ring and the device may engage one another in a snap-fit or a push-fit. More preferably, the device and the ring engage one another by means of cooperating screw-threads: for example the ring may be threaded internally and the device may be threaded externally, so that the ring can be connected to another component having an appropriately threaded external surface. It is particularly preferred that the threads on the device and the ring are such that they can be released from one another by relative rotation of less than about one turn, especially less than about one half turn, for example about one quarter turn, since it has been found that generally this is sufficient to retain the ring and the device together, while also facilitating subsequent removal of the device.

The device may be provided with formations, such as screw threads, at or towards the end remote from the ring for engaging formations on a component such as a union member in a tube coupling of the type disclosed in U.S. Pat. No. 3,484,123. The assembly can include such a component engaged with the formations on the device.

Preferably, the device maintains the ring and the collar longitudinally spaced apart. For example, the device may have a recess formed in its internal wall for receiving the collar, so that the collar is positively located axially relative to the device. Generally, a shape memory alloy collar will be such that it and the ring can only be positioned with their cooperating axially facing surfaces in contact with one another after the collar has been heated to cause it to shrink, since the axially facing surface or the ring will generally be recessed under a lip.

The construction of the device can be varied to suit requirements. In its simplest form, for example, it may comprise one or more fingers extending axially between the collar and the ring. Preferably, however, the device is generally closed in cross-section, for example the device is generally tubular, although it may have one or more openings in its wall. The use of a tubular device has the advantage that it affords greater protection to the collar, and to the tube after the collar has been affixed to it. The protection may be from deformation, or from contamination by foreign particles, or from both.

The cross-sectional configuration of the assembly and the component parts thereof will depend to a large extent on the object to which connection is to be made. In many situations, the object will be circular in cross-section, and the component parts of the assembly will therefore also be generally circular in cross-section, at least internally. Externally, the device and the ring may be provided with flats or textured surfaces to allow them to be gripped for rotation.

It is particularly preferred that the device is closed at or towards one end so that when the assembly is positioned on the end of an object, such as an open-ended tube, the closed end of the device covers the end of the object. This is particularly valuable when the object is an open-ended tube since the device can function as a cap to prevent ingress of foreign particles into the tube prior to connection of the tube to another tube or to a piece of equipment such as might be found in a hydraulic system or a fluid delivery system. Thus the device can serve at least two functions: it can serve to retain the collar and the ring in a desired orientation, and it can function as a dust cap. According to the present invention, these functions are provided by a single assembly, whereas previously it has been necessary to use a collar, a ring and a dust cap as separate components, with attendant disadvantages. Thus, an assembly which comprises a shape memory alloy collar can be positioned on the end of a tube, and the collar can be caused to shrink so as to engage the tube. The device may then be left on the end of the tube until it is desired to make use of the connection to the tube, and during that period, it can prevent entry of foreign particles into the tube, and protect the tube and the collar from physical damage.

Preferably, the device is provided with an internally projecting stop for locating the assembly axially with respect to the object. When the device is closed at or towards one end, the stop may be provided by the end wall of the device by abutting the end of the object, and it can therefore also function as a dust cap. Whether or not the device is closed, a suitable inwardly projecting stop may be provided as a shoulder projecting from the internal surface of the device, extending around the entire periphery or one or more parts thereof.

Preferably, the device is split axially so that it can be removed by transverse movement relative to the object, rather than by axial movement which may be restricted by the installed collar. The device may be split in such a way that it is formed as two or more parts. The parts may be fastened to one another by means of a hinge portion. The hinge portion may extend along the length of the device. More preferably, however, it extends across the device at an end thereof, for example in an end wall which functions as a dust cap. Alternatively, the parts may be separate, and may fit together, for example, using lugs and recesses, or as a snap fit.

Preferably, the device includes resiliently outwardly deformable projections on its internal wall for engaging the external surface of the object. Such projections serve to retain the assembly in a desired axial position on the object. The resilient deformation may be of portions of the device, the device being formed from a deformable material. For example, the projections may be formed on resiliently deformable axially extending fingers: the fingers may be defined by axially extending slits. Each projection may take the form of an inwardly extending lip, the distance between opposite lips being less than the relevant transverse dimension of the object; for example, if the device and the object are tubular, the internal diameter of the device measured between diametrically opposite projections is less than the external diameter of the object. The projections may be bevelled to facilitate insertion of the object into the device.

The alloy of a shape memory alloy collar is required to be capable of transforming between martensitic and austenitic phases. The alloy will be selected according to the temperatures to which the collar will be exposed before, during and after installation, and to the physical requirements placed on the collar when in use. The alloy may be based on copper, for example as disclosed in U.S. Pat. No. 4,144,057 and U.S. Pat. No. 4,144,104, or more preferably on nickel-titanium, for example as disclosed in U.S. Pat. Nos. 3,753,700, 4,337,090, 4,565,589 or 4,770,725. A preferred method of treatment of a nickel-titanium based shape memory alloy is disclosed in U.S. Pat. No. 4,740,253. The subject matter disclosed in these documents is incorporated herein by these references to the documents.

The collar may be provided with inwardly projecting teeth on its internal surface, which bite into the external surface of the object, to enhance the connection and the seal to the object, when the collar is caused to shrink.

The thermal transformation hysteresis loop of certain shape memory alloys, particularly certain nickel-titanium based alloys, is such that the alloys must be stored at temperatures significantly below ambient temperature to prevent transformation from the martensitic phase to the austenitic phase, with attendant change in configuration. This is generally achieved by submerging the alloy in liquid nitrogen. In the context of the present invention, the entire assembly may be submerged in a quantity of a fluid, such as liquid nitrogen, to maintain the temperature of the collar below the $A_s$ temperature of the alloy.

The cooperating axially facing surfaces on the collar and the ring may, but need not, be perpendicular to the axis of the object to be connected. Arranging the surfaces so that they are substantially perpendicular to the axis allows the axial force applied to the object through the ring and the collar to be maximized, and can enhance the seal between the ring and the collar. However, arranging the surfaces so that they are not perpendicular allows a force to be applied through the nut to force the collar against the object, which can enhance the seal between the collar and the object and can therefore be advantageous for many applications.

The device is preferably formed from a polymeric material for convenience and economy. The material may be, for example, a polyolefin such as polypropylene, a polyamide, a polyester or a polycarbonate. When the device is formed in two or more parts, joined by a hinge portion, and the hinge is formed integrally with the two parts, a degree of flexibility will be required of the material of the device. Forming the device from polymeric material has the advantage that it allows the device to be formed by moulding, for example by injection moulding. Preferably, the material of the device is transparent to allow the connection to the object to be inspected.

Alternatively, the connection may be inspected, to ensure that the collar has been placed accurately where desired, through an opening in the wall of the device. The opening may be provided at or towards an end of the device, through which the end of the object may be seen.

An additional advantage of the use of a polymeric material for the device is that the device may be colored simply by adding suitable colorants to the material, allowing assemblies to be color-coded, for example according to the size of object on which they are to be used.

When a shape memory alloy requires to be heated above ambient temperature in order to shrink, the device may be arranged to function as a source of heat. For example, when made from a polymeric material, it may include a conductive filler such as a carbon black, a particularly preferred composition being a blend of ultra-high molecular weight polyethylene and a carbon black.

BRIEF DESCRIPTION OF THE DRAWINGS

FIG. 1 is a section through an assembly of the present invention;

FIG. 2 is a section through the assembly shown in FIG. 1, having a tube positioned within it; and FIG. 3 is a section through the tube shown in FIG. 2, on which the collar has been fixed.

DESCRIPTION OF PREFERRED EMBODIMENTS

FIG. 1 shows an assembly 2 which comprises a shape memory alloy collar 4, a ring 6 and a device 8 with which the collar and the ring are engaged so that they are held coaxially with respect to one another.

The device is tubular and is closed by a wall at one end. It is formed into a polymeric material in two parts 12, 14 which are joined to one another by a hinge portion 16 in the end wall 10. The device is provided with a screw thread 18 on its external surface which engages a screw thread 20 on the internal surface of the ring. The device has a recess 21 formed in its internal wall for receiving the collar so that the collar is located axially relative to the device, and has a plurality of resiliently deformable axially extending fingers 22, each having an inwardly extending projection 24 at its end.

The collar is preferably formed from a nickel-titanium shape memory alloy, such as nickel-titanium-iron alloy as disclosed in U.S. Pat. No. 3,753,700, or a nickel-titanium-niobium alloy as disclosed in U.S. Pat. No. 4,770,725. It has an inwardly projecting tooth 26 on its internal surface. The collar has an axially facing surface 28 which, in use, cooperates with an axially facing surface 30 on the ring. The axially facing surface on the ring is recessed under a lip 32.

FIG. 2 shows the assembly 2 with a tube 40 inserted into it, until the tube abuts the end wall 10 which acts as an end stop for locating the assembly axially with respect to the tube.

The collar 4 is shown after it has been heated to a temperature above the $A_f$ temperature of the alloy (for example by removal from liquid nitrogen) so that it has shrunk, and the tooth 26 has bitten into the surface of the tube.

The fingers 22 have been deformed outwardly by the inserted tube. Friction between the projections 24 on the fingers and the external surface of the tube retains the ring 6 and the device 8 on the tube after the collar 4 has shrunk. The end wall 10 of the device is thus able to prevent ingress of particulate material into the tube 40.

The device 8 is removed by releasing it from the ring 6, by rotation of the ring relative to the device. The device may then be opened by flexing the hinge portion 10 and moving the two parts 10, 12 of the device transversely apart.

As shown in FIG. 3, the nut may then be moved along the tube until the cooperating surfaces 30, 28 on it and the collar abut one another. The screw thread 20 on the internal surface of the ring is then exposed for connection to another component, such as a union member of a tube coupling. Force may be applied axially to the tube 40 by means of the ring 6 through the collar 4. The tooth 26 can provide a seal between the collar and the tube. Preferably the cooperating surfaces on the ring and the collar are configured such that they provide a seal between the ring and the collar.

What is claimed is:

1. An assembly for forming a mechanical connection to an object, which comprises:
   (a) a collar formed from a shape memory alloy, which is transversely heat-shrinkable and has an axially facing surface;
   (b) a ring having an axially facing surface for cooperation with the axially facing surface on the collar so that, when the collar has been heated to cause it to shrink to grip the object, an axial force can be applied to the object through the collar by means of the ring; and
   (c) a device which releasably engages the ring and the collar so as to hold the ring and the collar coaxially with respect to one another and said ring, collar and device adapted to be positioned over the object.

2. An assembly as claimed in claim 1, in which the device and the ring are provided with cooperating screwthreads, by means of which the device and the ring engage one another.

3. An assembly as claimed in claim 1, in which the device has a recess formed in its internal wall for receiving the collar.

4. An assembly as claimed in claim 1, in which the device is provided with an internally projecting stop for locating the assembly axially with respect to the object.

5. An assembly as claimed in claim 1, in which the device is tubular.

6. An assembly as claimed in claim 1, in which the device is closed at or towards one end.

7. An assembly as claimed in claim 1, in which the device is split axially.

8. An assembly as claimed in claim 7 in which the device is formed in at least two parts.

9. An assembly as claimed in claim 7, in which the parts are joined to one another by means of a hinge portion.

10. An assembly as claimed in claim 9, in which the hinge portion is provided at an end of the device.

11. An assembly as claimed in claim 1, in which the device includes resiliently outwardly deformable projections on its internal wall for engaging the external surface of the object.

12. An assembly as claimed in claim 11, in which the projections are provided on resiliently deformable, axially extending fingers.

13. An assembly as claimed in claim 1, in which at least one inwardly projecting tooth is provided on the internal surface of the collar.

14. An assembly as claimed in claim 1, which is submerged in a quantity of fluid for maintaining the temperature of the collar below the $A_s$ temperature of the alloy.

15. A method of forming a mechanical connection to an object, which comprises:
   (a) providing an object, and an assembly as claimed in claim 1;
   (b) positioning the object so that it extends through the collar and the ring;
   (c) increasing the temperature of the collar to a temperature above the $A_s$ temperature of the alloy to cause the collar to shrink transversely so as to engage the object;
   (d) removing the device; and
   (e) moving the ring axially relative to the object and the collar so that the said axially facing surfaces of the ring and the collar are in contact.

16. An object to which a mechanical connection has been made by a method as claimed in claim 15.

17. A method as claimed in claim 15, which includes the step of connecting the ring to another object, so that force can be applied between the objects through the ring and the collar.

18. A method of forming a mechanical connection to an object, which comprises:

(a) providing an object, and an assembly which comprises
  (i) a collar having an axially facing surface,
  (ii) a ring having an axially facing surface for cooperation with the axially facing surface on the collar so that, when the collar is positioned around, and engages, the object, an axial force can be applied to the object through the collar by means of the ring, and
  (iii) a device which releasably engages the ring and the collar so as to hold the ring and the collar coaxially with respect to one another;
(b) positioning the object so that it extends through the collar and the ring;
(c) reshaping at least one of the object and the collar so as to cause the collar to engage the exterior surface of the object;
(d) removing the device; and
(e) moving the ring axially relative to the object and the collar so that the said axially facing surfaces of the ring and the collar are in contact.

19. A method as claimed in claim 16, in which the collar is formed from a shape memory alloy and is transversely heat-shrinkable, and in which, in the reshaping step, the temperature of the collar is increased to a temperature above the $A_s$ temperature of the alloy to cause the collar to shrink transversely so as to engage the object.

20. An assembly for forming a mechanical connection to an object by a method as claimed in claim 16.

21. An object to which a connection has been made by a method as claimed in claim 18.

22. A method as claimed in claim 18, which includes the step of connecting the ring to another object, so that force can be applied between the objects through the ring and the collar.

* * * * *